United States Patent
Yamamoto et al.

(10) Patent No.: US 9,535,401 B2
(45) Date of Patent: Jan. 3, 2017

(54) ELECTRONIC HOLOGRAPHIC DISPLAY DEVICE

(71) Applicant: National Institute of Information and Communications Technology, Koganei-shi, Tokyo (JP)

(72) Inventors: Kenji Yamamoto, Tokyo (JP); Yasuyuki Ichihashi, Tokyo (JP); Takanori Senoh, Tokyo (JP); Ryutaro Oi, Tokyo (JP); Taiichiro Kurita, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 99 days.

(21) Appl. No.: 14/415,230

(22) PCT Filed: Jul. 17, 2013

(86) PCT No.: PCT/JP2013/069426
§ 371 (c)(1),
(2) Date: Jan. 16, 2015

(87) PCT Pub. No.: WO2014/014030
PCT Pub. Date: Jan. 23, 2014

(65) Prior Publication Data
US 2015/0185699 A1    Jul. 2, 2015

(30) Foreign Application Priority Data

Jul. 17, 2012  (JP) .................................. 2012-158862

(51) Int. Cl.
*G03H 1/22* (2006.01)
*G02B 27/26* (2006.01)
(Continued)

(52) U.S. Cl.
CPC ............ *G03H 1/2205* (2013.01); *G02B 27/26* (2013.01); *G03H 1/2294* (2013.01);
(Continued)

(58) Field of Classification Search
CPC ............................. G03H 1/22–1/2294; G03H 2001/2207–2001/2297; G03H 1/02–1/028; G03H 2001/0204–2001/0296; G02B 27/22–27/2292; H04N 13/04–13/0497
(Continued)

(56) References Cited

U.S. PATENT DOCUMENTS

| 6,292,304 B1 * | 9/2001 | Kim ...................... G02B 27/09 |
| | | 359/291 |
| 6,417,953 B1 * | 7/2002 | Iizuka ...................... G02F 1/33 |
| | | 250/235 |

(Continued)

FOREIGN PATENT DOCUMENTS

| JP | 07-129067 | 5/1995 |
| JP | 08-160416 | 6/1996 |

(Continued)

OTHER PUBLICATIONS

International Search Report for International Application No. PCT/JP2013/069426 mailed Aug. 20, 2013 (4 pages).

(Continued)

*Primary Examiner* — Bumsuk Won
*Assistant Examiner* — Jeffrey Madonna
(74) *Attorney, Agent, or Firm* — Merchant & Gould P.C.

(57) ABSTRACT

An electronic holographic display device includes: a beam emitting device; a plurality of polarizing beam splitters; a plurality of spatial light modulators, each of which is disposed with prescribed distances therebetween and modulates a beam vertically made incident from the corresponding polarizing beam splitter; a magnifying optical system;

(Continued)

and a reducing optical system. The magnifying optical system includes a first lens array and a second lens array. The reducing optical system includes a third lens array and a fourth lens array. A distance "a" between the spatial light modulator and the first lens is represented by $a=(k+2)f_0/(k+1)$, wherein a ratio "k" is a distance between two adjacent spatial light modulators, to a size of the spatial light modulator, and $f_0$ is a focal point distance of the first lens.

3 Claims, 4 Drawing Sheets

(51) Int. Cl.
    *G02B 3/00* (2006.01)
    *G02B 27/28* (2006.01)
(52) U.S. Cl.
    CPC .......... *G02B 3/0062* (2013.01); *G02B 27/283* (2013.01); *G03H 2001/221* (2013.01); *G03H 2001/2239* (2013.01); *G03H 2225/60* (2013.01)
(58) Field of Classification Search
    USPC ................. 359/1–35, 237–324, 462–477
    See application file for complete search history.

(56) References Cited

U.S. PATENT DOCUMENTS

| | | | |
|---|---|---|---|
| 6,568,810 B2* | 5/2003 | Hori ..................... | G03B 21/208 348/291 |
| 2004/0061673 A1* | 4/2004 | Ishikawa ............ | G02B 26/0841 345/84 |
| 2006/0291020 A1* | 12/2006 | Knox .................... | G02B 5/0215 359/15 |
| 2008/0094682 A1* | 4/2008 | Greywall ........... | G02B 26/0841 359/245 |
| 2009/0021811 A1* | 1/2009 | Yamamoto ............. | G11B 7/083 359/3 |
| 2009/0231697 A1* | 9/2009 | Marcus .................... | H04N 3/10 359/465 |
| 2010/0103486 A1* | 4/2010 | Kroll ....................... | G03H 1/02 359/9 |
| 2012/0008482 A1* | 1/2012 | Bablumyan .............. | G03H 1/02 369/103 |

FOREIGN PATENT DOCUMENTS

| | | |
|---|---|---|
| JP | 09-318910 | 12/1997 |
| JP | 2005-165224 | 6/2005 |
| JP | 2010-237691 | 10/2010 |

OTHER PUBLICATIONS

Takaki et al. "Frameless hologram display module employing resolution redistribution optical system." *Proc of SPIE.* 7619:761902-1-8 (2010).
International Written Opinion for International Application No. PCT/JP2013/069426 mailed Aug. 20, 2013 (4 pages).
Mishina et al. "Holographic display with enlarged viewing-zone using high-resolution LC panel." *Proceedings of SPIE.* vol. 5005 (2003) pp. 137-144.
Senoh et al. "Wide viewing-zone-angle full-color electronic holography system using very high resolution liquid crystal display panels." *Proc. of SPIE.* vol. 7957 (2011) pp. 795709-1-12.
Yamamoto et al. "3D objects enlargement technique using an optical system and multiple SLMs for electronic holography." *Opitics Express.* vol. 20, No. 19. (2012) pp. 1-8.

* cited by examiner

RELATED ART

ELECTRONIC HOLOGRAPHIC DISPLAY DEVICE

CROSS REFERENCE TO RELATED APPLICATION

This application is a National Stage Application of PCT/JP 2013/069426, filed on Jul. 17, 2013, and which application is incorporated herein by reference. To the extent appropriate, a claim of priority is made to the above disclosed application.

TECHNICAL FIELD

The present invention relates to an electronic holography display apparatus which displays a 3D reconstructed image using an electronically-generated hologram (interference pattern).

BACKGROUND ART

Binocular-type stereoscopic televisions and movies using eyeglasses have become popular in recent years. Multi-eye type stereoscopic displays without a need of eyeglasses have also been developed. A technique of displaying a 3D image of binocular type or of multi-eye type uses, however, only part of factors which enables stereoscopy (such as binocular parallax, convergence, focusing, and motion parallax). Without effect of the focusing, in particular, such problems may occur that viewers of a stereoscopic image displayed with the above-described techniques feel fatigued, have headache, or the like.

In the meantime, a 3D image displayed using a technique of electronic holography satisfies all of the above-described factors for stereoscopy, and is thus considered to be capable of providing a 3D image which is naturally acceptable and has less burden on a human body. The electronic holography displays a 3D reconstructed image in such a manner that: data on a hologram is acquired with a method of directly photographing a hologram using an electrical imaging element such as a CCD (Charge Coupled Device) or with a CGH (Computer Generated Hologram) which computes a hologram based on 3D spatial information of an object; and a spatial light modulator (SLM) such as a liquid crystal panel displays the hologram.

RELATED ART DOCUMENT

Non-Patent Document

Y. Takaki and Y. Tanemoto, "Frameless hologram display module employing resolution redistribution optical system", Proc. SPIE, vol. 7619, 761902, 2010 (which may also be referred to as Non-Patent Document 1 hereinafter).

SUMMARY OF THE INVENTION

Problems to be Solved by the Invention

Figure 4A:
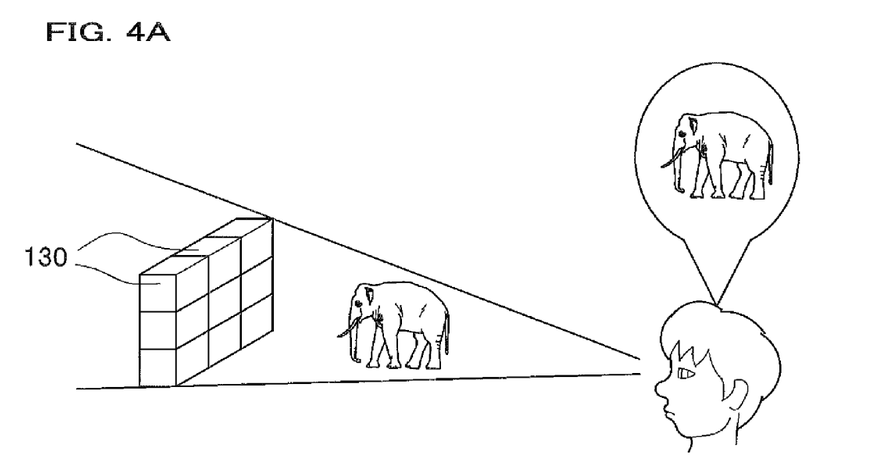
FIG. 4A is a perspective view illustrating a state in which a plurality of spatial light modulators are arranged without any gaps therebetween.
Figure 4B:
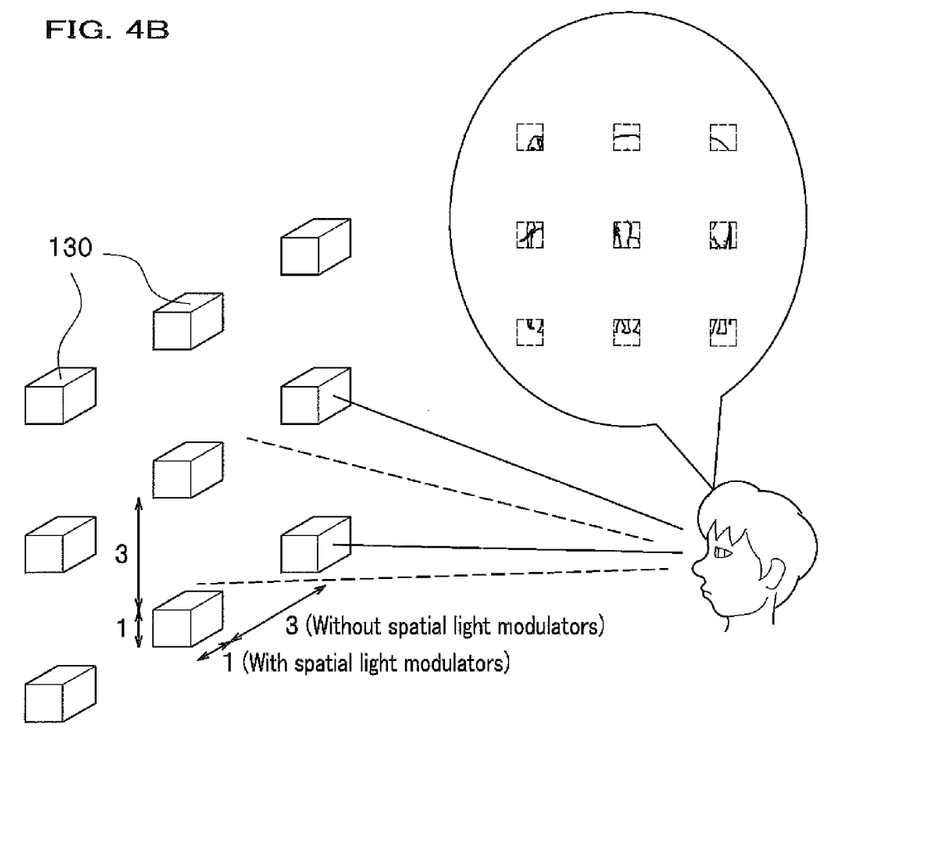
FIG. 4B is a perspective view illustrating a state in which a plurality of the spatial light modulators are arranged with prescribed gaps therebetween.

In applying the spatial light modulator to an electronic holography display apparatus, a technique of arranging a plurality of the spatial light modulators has been proposed, because a size of a 3D reconstructed image displayable by a single unit of the spatial light modulator is small. It is not possible in the technique, however, as shown in FIG. 4A, to closely arrange a plurality of spatial light modulators 130 without gaps between one another. It is thus required, as shown in, for example, FIG. 4B, to put each of the spatial light modulators with a space three times or more a size of the spatial light modulator itself between one another. This has a problem that some portions of the 3D reconstructed image may be missed.

Non-Patent Document 1, for example, has proposed a technique to solve the above-described problems. The technique has, however, a problem that a parallax in a vertical direction is lost. There is another problem that, in principle, some portions of the 3D reconstructed image are also missed, though may be slightly, owing to a thickness of an outer frame of a module.

The present invention has been made in light of the problems as described above and in an attempt to provide an electronic holography display apparatus which can display a 3D reconstructed image without losing the parallax in the vertical direction and with no missing portions, when a size of a 3D reconstructed image is magnified using a plurality of the spatial light modulators.

Means for Solving the Problem

In order to solve the problems, an electronic holography display apparatus according to a first aspect of the present invention is provided which displays a 3D reconstructed image based on an electronically generated hologram. The electronic holography display apparatus includes: a beam emitting device that emits parallel beams; a plurality of polarizing beam splitters each of which reflects, from the parallel beams emitted from the beam emitting device, a portion of polarization components contained in the parallel beams, makes another portion of the polarization components pass therethrough, and makes a beam coming from a direction of the reflection pass therethrough; a plurality of spatial light modulators each of which is disposed in a same plane with a prescribed distance between adjacent spatial light modulators, facing each of the corresponding polarizing beam splitters, modulates a beam which has been reflected by the polarizing beam splitter and has been then made incident vertically thereon, and emits the modulated beam; a magnifying optical system that magnifies a luminous flux diameter of each of the beams having been emitted from a plurality of the spatial light modulators and then having been passed through a plurality of the corresponding polarizing beam splitters; and a reducing optical system that reduces the luminous flux diameter of the beam emitted from the magnifying optical system. The magnifying optical system includes: a first lens array that is disposed on an emission side of the spatial light modulators and includes a plurality of lenses disposed in array in a same plane, corresponding to each of the spatial light modulators; and a second lens array that is disposed on an emission side of the first lens array, includes a plurality of lenses disposed in array in a same plane, corresponding to each of the lenses constituting the first lens array, and has a focal point distance larger than that of the first lens array. The reducing optical system comprises: a third lens that is disposed on an emission side of the second lens array and has a diameter such that the beam emitted from the second lens array can be made incident thereon; and a fourth lens that is disposed on an emission side of the third lens and has a focal point distance smaller than that of the third lens. A distance "a" between the spatial light modulator and the first lens array is represented by $a=(k+2) f_0/(k+1)$, in which "k" is a ratio of a distance between two adjacent spatial light modulators, to a size of the spatial light modulator, and $f_0$ is the focal point distance of the first lens.

In the electronic holography display apparatus configured as described above, parallel beams emitted from the beam emitting device are made incident on a plurality of the polarizing beam splitters. The parallel beams are then separated according to polarization components, and only a beam of a prescribed polarization component (for example, S polarization) is reflected to each of a plurality of the spatial light modulators corresponding thereto. The beam reflected by the polarizing beam splitter makes incident vertically on the spatial light modulator, and is modulated according to hologram data by the spatial light modulator. The beam modulated by the spatial light modulator passes through the polarizing beam splitter and is made incident on the magnifying optical system. A luminous flux of the beam is magnified by the magnifying optical system. This makes it possible to magnify reconstructed images generated by the spatial light modulators, to thereby eliminate gaps between the reconstructed images and join the adjacent reconstructed images together. The beam whose luminous flux has been magnified by the magnifying optical system is made incident on the reducing optical system, at which the luminous flux is then reduced. This means that the viewing-zone angles of the reconstructed images having been narrowed in exchange for magnifying sizes of the images by the magnifying optical system are magnified once again.

In the electronic holography display apparatus, the distance "a" between a plurality of the spatial light modulators and the first lens array is set based on a relation between: a ratio k of the size of the spatial light modulator 30 to a distance between two adjacent spatial light modulators 30; and the focal point distance $f_0$ of the first lens array 41. This makes it possible to form the reconstructed image (actual image) magnified by the magnifying optical system 40 at a position of the second lens array 42, thus allowing the beam outgoing from the spatial light modulator 30 to be made incident on the second lens array 42 without fail.

An electronic holography display apparatus according to a second aspect of the present invention is configured as the electronic holography display apparatus according to the first aspect of the present invention in which a ratio of the focal point distance of the second lens array to that of the first lens array is equal to a ratio of the focal point distance of the fourth lens to that of the third lens.

In the electronic holography display apparatus configured as described above, reconstructed images generated by a plurality of the spatial light modulators can be joined together and displayed in an original image size, by making a magnifying power of the magnifying optical system equal to a reducing power of the reducing optical system.

An electronic holography display apparatus according to a third aspect of the present invention is configured as the electronic holography display apparatus according to the first aspect of the present invention in which the ratio of the focal point distance of the second lens array to that of the first lens array is different from the ratio of the focal point distance of the fourth lens to that of the third lens.

In the electronic holography display apparatus configured as described above, reconstructed images generated by a plurality of the spatial light modulators can be joined together and displayed in a magnified or reduced image size, by making the magnifying power of the magnifying optical system different from the reducing power of the reducing optical system.

Advantageous Effects of the Invention

With the first aspect of the present invention, even if a plurality of the spatial light modulators are disposed with prescribed distances therebetween, a 3D reconstructed image can be displayed without losing parallax in the vertical direction and with no missing portions, as is a case where a plurality of the spatial light modulators are disposed without any gaps therebetween.

With the second aspect of the present invention, a 3D reconstructed image can be displayed with no missing portions and with an image size and a viewing-zone angle same as those of the original reconstructed image generated by the spatial light modulators.

With the second aspect of the present invention, a 3D reconstructed image can be displayed with no missing portions and with an image size or a viewing-zone angle different from that of the original reconstructed image generated by the spatial light modulators.

BRIEF DESCRIPTION OF THE DRAWINGS

FIG. 4A and FIG. 4B are schematic views each illustrating spatial light modulators of an electronic holography display apparatus according to the related art.

EMBODIMENT FOR CARRYING OUT THE INVENTION

[Structure of Electronic Holography Display Apparatus]

A structure of an electronic holography display apparatus according to an embodiment of the present invention is described with reference to related drawings. First are described structural elements of the electronic holography display apparatus with reference to FIG. 1, and then, a position where each of the structural elements of the electronic holography display apparatus is disposed and a position where a 3D reconstructed image is displayed, with reference to FIG. 2. In the following description, the same names and reference numerals are given to the same structural elements, and detailed description thereof is omitted herefrom. Note that the structural elements of the electronic holography display apparatus illustrated in the related drawings may be shown with exaggerated sizes and installation intervals.

The electronic holography display apparatus 1 displays a 3D reconstructed image using an electronically-generated hologram. More specifically, the electronic holography display apparatus 1: displays a hologram based on hologram data inputted from a hologram generation unit not shown; and a reconstruction beam is illuminated to the hologram, to thereby display the 3D reconstructed image. Note that the "3D reconstructed image" may be abbreviated as a "reconstructed image" in the following explanation.

How to make a hologram which is inputted in the electronic holography display apparatus 1 is not specifically limited. As described above, a hologram may be directly photographed by a CCD or the like and may be then inputted. Or, a hologram may be generated on a computer by a CGH and may be then inputted. It is assumed herein that the hologram inputted in the electronic holography display apparatus 1 is generated using half-zone-plate processing in which light diffusing from an object is limited to half and also using a single-sideband method in which a first spatial filter 43 or a second spatial filter 53 to be described hereinafter removes unnecessary light other than an object beam.

Figure 1:
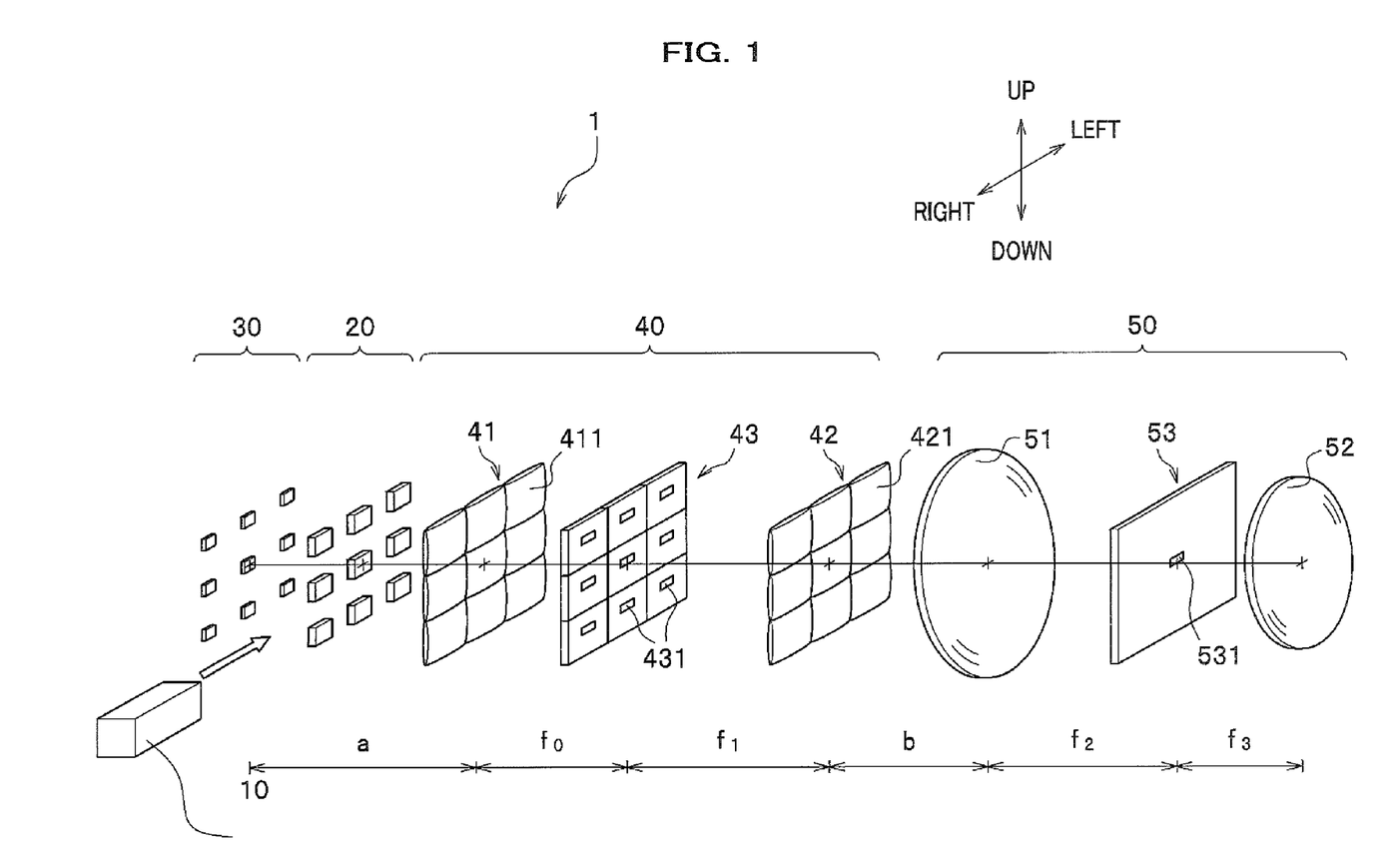
FIG. 1 is a perspective view illustrating an entire structure of an electronic holography display apparatus according to an embodiment of the present invention.

The electronic holography display apparatus 1 includes, as illustrated in FIG. 1: a beam emitting device 10; a polarizing beam splitter 20; a spatial light modulator 30; a magnifying optical system 40; and a reducing optical system 50. Next is described each of the above-described structural elements of the electronic holography display apparatus 1.

The beam emitting device 10 emits parallel beams of light as reproducing illumination light to a hologram. The beam emitting device 10 is disposed, as illustrated in FIG. 1, lateral to the polarizing beam splitter 20 and is configured to emit parallel beams to each of a plurality of the polarizing beam splitters 20. The structure makes it possible for the beam emitting device 10 to make a beam of a prescribed polarization component (herein, S-polarization component) perpendicularly incident on the spatial light modulator 30 via the polarizing beam splitter 20. A specific example of the beam emitting device 10 which can be used herein is not specifically limited to as long as it is excellent in coherence such as, for example, helium-neon laser, argon ion laser, krypton ion laser, helium-cadmium laser, neodymium-YAG (Nd:YAG) laser, semiconductor laser, ruby laser, or the like.

The polarizing beam splitter 20 splits an incident beam according to polarization components. A plurality (herein, nine units) of the polarizing beam splitters 20 are disposed on an emission side of the corresponding spatial light modulators 30, as illustrated in FIG. 1. The polarizing beam splitter 20 are arranged such that each of the centers thereof matches with an optical axis of each of the corresponding spatial light modulators 30, as illustrated in FIG. 1. The polarizing beam splitter 20 makes part of the polarization components of the parallel beams emitted from the laterally-disposed beam emitting device 10, for example, P polarization, transmit therethrough without any change; and, on the other hand, makes other part of the polarization components, for example, S polarization, reflect to each of the corresponding spatial light modulators 30, to thereby split the parallel beam into two. The polarizing beam splitter 20 also makes light coming from a direction of the reflected light, that is, light coming from the spatial light modulator 30 transmit therethrough.

Note that FIG. 1 illustrates a state in which a plurality of the polarizing beam splitters 20 are two-dimensionally arranged on a same plane. Actually, however, each of the polarizing beam splitters 20 is disposed by being shifted from each other in an optical axis direction thereof by a distance corresponding to a length of a prescribed number of the polarizing beam splitter 20 itself (see FIG. 2 to be described hereinafter). This makes it possible for beams emitted from the laterally-disposed beam emitting device 10 as illustrated in FIG. 1, to reach all of the spatial light modulators 30. A specific example of the polarizing beam splitter 20 used herein is, for example, a cubic polarizing beam splitter formed by gluing together two 45° (45 degrees) right-angle prisms, with an angled face thereof coated with dielectric polarization film.

The spatial light modulator 30 spatially modulates an incident beam according to hologram data. The spatial light modulator 30 is, for example, a reflection type liquid crystal display panel having a plurality of pixels. As illustrated in FIG. 1, a plurality (herein, nine units) of the spatial light modulators 30 corresponding to the respective polarizing beam splitters 20 are disposed in the same plane at prescribed intervals from one another, as illustrated in FIG. 1. The spatial light modulator 30: displays a hologram based on a hologram data inputted from the hologram generation unit not shown; modulates a beam which is reflected by the polarizing beam splitter 20 and is then projected at right angles; and emits the beam as a reconstruction beam.

Herein, each of the spatial light modulators 30 arranged in the same plane as illustrated in FIG. 1 displays a part of the entire hologram corresponding to a position of each of the spatial light modulators 30. That is, the hologram generation unit not shown inputs, into each of the spatial light modulators 30, hologram data showing not the entire hologram but a part of the hologram corresponding to the position thereof. Each part of the hologram displayed by each of a plurality of the spatial light modulators 30 is configured to be joined together, to thereby display the one whole hologram.

More specifically, when each of the spatial light modulators 30 displays a part of the hologram, the spatial light modulator 30 performs spatial light modulation to an incident beam by rotating a polarization plane of the incident beam for each pixel, and emits the modulated beam as a reconstruction beam to the polarizing beam splitter 20. At this time, the spatial light modulator 30 performs polarization conversion of the P polarization which has been split and made incident by the polarizing beam splitter 20, into the S polarization, and reflects the S polarization to the polarizing beam splitter 20. The S polarization reflected from the spatial light modulator 30 as described above pass through the polarizing beam splitter 20 and is made incident into a first lens array 41 of the magnifying optical system 40.

The magnifying optical system 40 magnifies a reconstructed image in size. More specifically, the magnifying optical system 40 magnifies a luminous flux diameter of the beam transmitted from the spatial light modulator 30 and passing through the polarizing beam splitter 20, as illustrated in FIG. 1, to thereby magnify the reconstructed image in size. The magnifying optical system 40 includes, as illustrated in FIG. 1, the first lens array 41, a second lens array 42, and the first spatial filter 43.

The first lens array 41 collects light from the spatial light modulator 30. The first lens array 41 is disposed on the emission side of the spatial light modulator 30 spaced with a prescribed distance "a" as illustrated in FIG. 1. The prescribed distance "a" is determined according to a focal point distance $f_0$ of the first lens array 41 and a focal point distance $f_1$ of the second lens array 42. Detailed description thereof is, however, made hereinafter.

The first lens array 41 includes a plurality (herein, nine) of lenses 411 disposed in array in the same plane corresponding to the respective spatial light modulators 30, as illustrated in FIG. 1. The lens 411 is made up of a rectangle lens and is arranged without any space with the adjacent lens 411. The first lens array 41 is also disposed such that an optical axis of each of the lenses 411 matches with an optical axis of each of the corresponding spatial light modulators 30, as illustrated in FIG. 1. Each of the lenses 411 of the first lens array 41: collects light which is emitted from the spatial light modulator 30 and passes through the polarizing beam splitter 20; and emits the light to each of corresponding lenses 421 of the second lens array 42, as illustrated in FIG. 1.

The second lens array 42 collimates the light from the first lens array 41. The second lens array 42 is disposed on an emission side of the first lens array 41 at a prescribed interval "$f_0+f_1$", as illustrated in FIG. 1. The prescribed interval "$f_0+f_1$" means a focal point distance $f_0$ of the first lens array 41 plus a focal point distance $f_1$ of the second lens array 42 as illustrated in FIG. 1.

The second lens array 42 includes a plurality (herein, nine) of lenses 421 disposed in array in the same plane corresponding to the respective spatial light modulators 30 as illustrated in FIG. 1. The lens 421 is made up of a rectangle lens and is disposed without any space with the adjacent lens 421 as illustrated in FIG. 1. The second lens array 42 is also arranged such that an optical axis of each of the lenses 421 matches with an optical axis of each of the corresponding lenses 411 of the first lens array 41, as illustrated in FIG. 1. Each of the lenses 421 of the second lens array 42: collimates the beam emitted from the lens 411 of the first lens array 41; and emits the beam to a third lens 51 of the reducing optical system 50, as illustrated in FIG. 1.

A magnifying power of the magnifying optical system 40 is determined according to a ratio of a focal point distance $f_1$ of the second lens array 42 to the focal point distance $f_0$ of the first lens array 41. The focal point distance $f_1$ of each of the lenses 421 constituting the second lens array 42 is configured to be larger than the focal point distance $f_0$ of each of the lenses 411 constituting the first lens array 41. This makes it possible for the magnifying optical system 40 to magnify a reconstructed image in size by as much as the ratio of the focal point distance $f_1$ of the second lens array 42 to the focal point distance $f_0$ of the first lens array 41.

The first spatial filter 43 removes unnecessary light other than an object beam from a reconstruction beam. A first spatial filter 43 is disposed on a rear side focal plane of the first lens array 41 as well as on a front side focal plane of the second lens array 42 as illustrated in FIG. 1. The first spatial filter 43 also has a plurality of (herein, nine) openings 431 formed corresponding to the lenses 411 of the first lens array 41 as illustrated in FIG. 1.

A plurality of the openings 431 of the first spatial filter 43 are formed based on a pixel interval "g" and the focal point distance $f_0$ of the spatial light modulator 30, and on the hologram data inputted from the hologram generation unit not shown to the spatial light modulator 30. That is, as described above, the hologram data in which a hologram is generated using the half-zone-plate processing in which light diffusing from an object is limited to half, is inputted into the spatial light modulator 30 of the electronic holography display apparatus 1 according to the present invention. In the meantime, the first spatial filter 43 has the openings 431 formed on a side to which the light limitation is not performed when the hologram is generated. This makes it possible for the first spatial filter 43 to pass an object beam (0 order diffracted light) through the openings 431 and also to cut off unnecessary light (conjugate light, transmission light, and high order light of object beam, conjugate light, and transmission light) using a portion other than the openings 431. Note that a method of cutting off unnecessary light and taking out only an object beam as described above is called the single sideband method. As the half-zone-plate processing and the single sideband method used in the present invention, a method proposed in "Japanese Laid-Open Patent Application, Publication No. 2009-63682" may be used, for example.

The reducing optical system 50 reduces a reconstructed image in size. The reducing optical system 50 reduces a luminous flux diameter of the light emitted from the magnifying optical system 40 as illustrated in FIG. 1, to thereby reduce the reconstructed image in size. Note that the reducing optical system 50 reduces the luminous flux diameter once having been magnified by the magnifying optical system 40. This is because, if the magnifying optical system 40 magnifies a reconstructed image only in size without changing the number of pixels, the reconstructed image has a narrower viewing-zone angle in exchange for a larger reconstructed image in size. Thus, the reducing optical system 50 is disposed on the emission side of the magnifying optical system 40 at which the reconstructed image is reduced in size. This can re-enlarge the viewing-zone angle of the reconstructed image which has been made narrower in exchange for magnification of the reconstructed image in size by the magnifying optical system 40. The reducing optical system 50 includes, as illustrated in FIG. 1, the third lens 51, a fourth lens 52, and the second spatial filter 53.

The third lens 51 collects light from the second lens array 42. The third lens 51 is disposed on an emission side of the second lens array 42 at a prescribed interval "b" as illustrated in FIG. 1. A value of the prescribed interval "b" is not specifically limited and any value may be used.

The third lens 51 has a diameter such that the light emitted from the second lens array 42 can be made incident thereinto as illustrated in FIG. 1. Further, the third lens 51 is disposed such that an optical axis of the third lens 51 matches with an optical axis of a lens 421 arranged at the center of the second lens array 42 as illustrated in FIG. 1. The third lens 51 collects the beam emitted from the second lens array 42 and emits the beam to the fourth lens 52.

The fourth lens 52 collimates the beam from the third lens 51. The fourth lens 52 is disposed on an emission side of the third lens 51 at a prescribed interval $f_2+f_3$ as illustrated in FIG. 1. The prescribed interval $f_2+f_3$ means a sum of a focal point distance $f_2$ of the third lens 51 plus a focal point distance $f_3$ of the fourth lens 52 as illustrated in FIG. 1.

The fourth lens 52 has a diameter such that the beam emitted from the third lens 51 is made incident thereinto as illustrated in FIG. 1. Further, the fourth lens 52 is disposed such that an optical axis of the fourth lens 52 matches with an optical axis of the third lens 51 as illustrated in FIG. 1. The fourth lens 52 collimates the beam emitted from the third lens 51 and emits the collimated beam.

A reducing power of the reducing optical system 50 is determined by a ratio of a focal point distance $f_2$ of the third lens 51 to the focal point distance $f_3$ of the fourth lens 52. The focal point distance $f_3$ of the fourth lens 52 is configured to be smaller than the focal point distance $f_2$ of the third lens 51. This makes it possible for the reducing optical system 50 to reduce a reconstructed image in size by as much as the ratio of the focal point distance $f_3$ of the fourth lens 52 to the focal point distance $f_2$ of the third lens 51.

The second spatial filter 53 removes unnecessary light other than an object beam from a reconstruction beam. The second spatial filter 53 is disposed on a rear side focal plane of the third lens 51 as well as on a front side focal plane of the fourth lens 52 as illustrated in FIG. 1. The second spatial filter 53 also has an opening 531 formed corresponding to the third lens 51 as illustrated in FIG. 1.

The opening 531 formed in the second spatial filter 53 cuts off unnecessary light and takes out only an object beam using the single sideband method, similarly to the above-described first spatial filter 43. The second spatial filter 53 is configured similarly to the above-described first spatial filter 43 except the number of the opening 531, detailed description of which is thus omitted herefrom. In FIG. 1, both the first spatial filter 43 and the second spatial filter 53 are provided as spatial filters for removing unnecessary light from the reconstruction beam. However, only any one of the two filters may be provided.

[Positions where Components are Disposed and Position where Reconstructed Image is Displayed]

Figure 2:
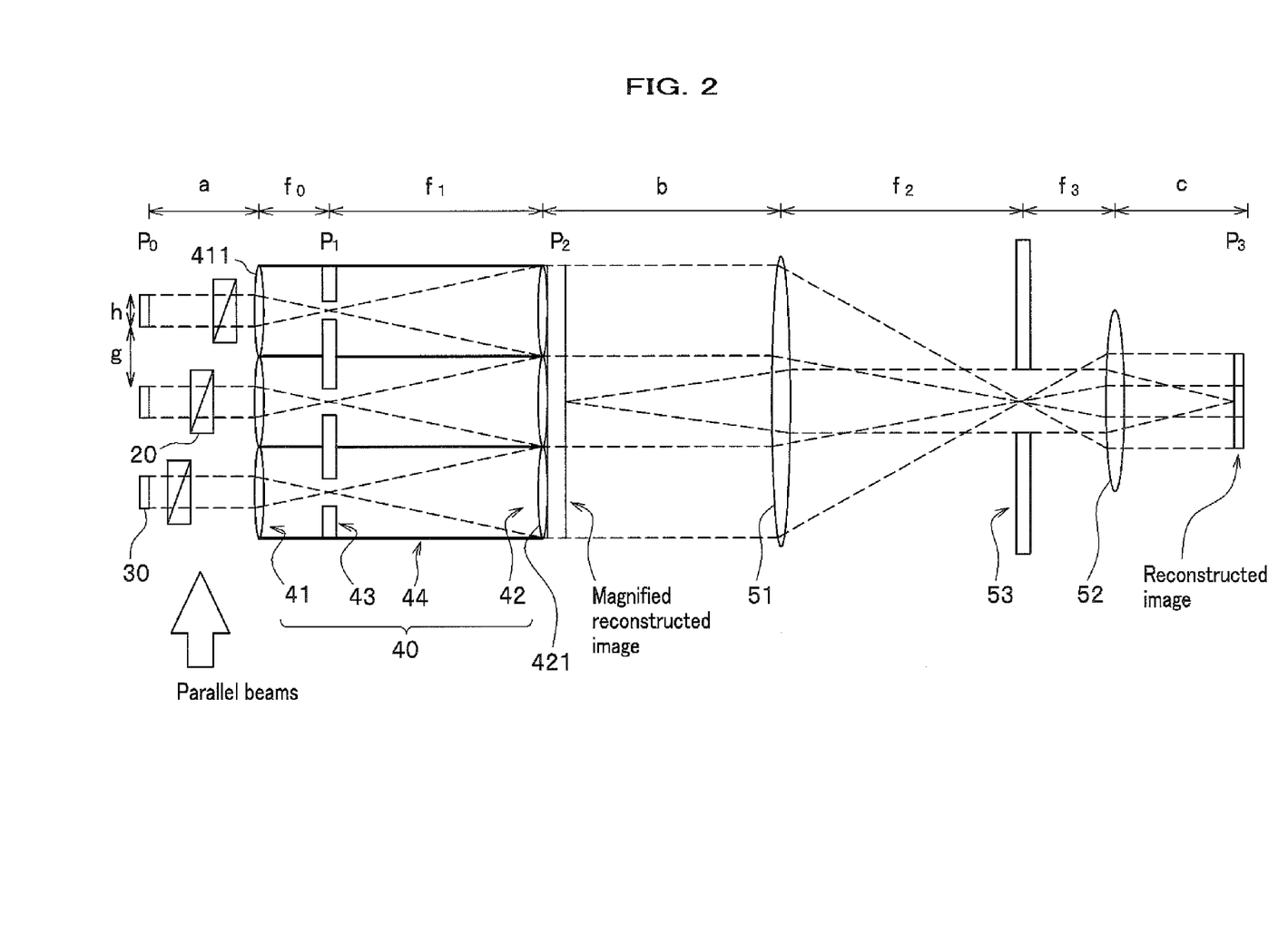
FIG. 2 is a top view for explaining positions where components of the structure are disposed and positions where 3D reconstructed images are displayed in the electronic holography display apparatus according to the embodiment of the present invention.

Next are described the positions where the structural elements of the electronic holography display apparatus 1 are disposed and the position where a reconstructed image is displayed with reference to FIG. 2. One example of the disposed positions of the structural elements of the electronic holography display apparatus 1 and the displayed position of the reconstructed image are described herein assuming a case in which: a ratio between a size "h" of each side of the spatial light modulator 30 which is assumed to be square-shaped, and a distance "g" between two adjacent spatial light modulators 30 is 1:3; and a reconstructed image made by the spatial light modulator 30 is displayed at an original size thereof without magnification. Note that the size h of the spatial light modulator 30 herein means, as shown in FIG. 2, a horizontal or vertical length of the spatial light modulator 30 which is assumed to be square-shaped having the same horizontal and vertical sizes h. Note that FIG. 2 schematically illustrates the disposed positions of the structural elements of the electronic holography display apparatus 1, which is thus different from an actual disposed position.

In the electronic holography display apparatus 1, it is assumed that there is a relationship between the focal point distance $f_0$ of the first lens array 41 and the focal point distance $f_1$ of the second lens array 42 shown in Expression (1) as follows:

$$f_1 = (1 + g/h) f_0 \qquad \text{Expression (1)}$$

The term "1+g/h" in Expression (1) as above means a magnifying power of the magnifying optical system 40. Given "g/h=k", the magnifying power of the magnifying optical system 40 can be represented by "k+1".

In the case as described above in which the ratio between the size h of the spatial light modulator 30 and the distance between two adjacent spatial light modulators 30 is 1:3, "$f_1=4f_0$" is obtained from Expression (1) shown above. Hence, in the case illustrated in FIG. 2, the focal point distance $f_1$ of the second lens array 42 is made four times the focal point distance $f_0$ of the first lens array 41, and the magnifying power of the magnifying optical system 40 is set at 4×. Note that in a case where the ratio between the size h of the spatial light modulator 30 and the distance "g" between the adjacent spatial light modulators 30 is, for example, 1:1, the focal point distance $f_1$ of the second lens array 42 is set to be twice the focal point distance $f_0$ of the first lens array 41, based on Expression (1) as described above, and the magnifying power of the magnifying optical system 40 is set at 2×.

In the electronic holography display apparatus 1, it is assumed that the distance "a" between the spatial light modulator 30 and the first lens array 41 takes a value shown in Expression (2) as follows:

$$a = f_0(f_0 + f_1)/f_1 \qquad \text{Expression (2)}$$
$$= (k+2)f_0/(k+1)$$

If the magnifying power "k+1" of the magnifying optical system 40 of is 4 as described above, then "$a=1.25f_0$" based on Expression (2) described above. Therefore, in the case illustrated in FIG. 2, the distance "a" between the spatial light modulator 30 and the first lens array 41 is set at 1.25 times the focal point distance $f_0$ of the first lens array 41.

With this configuration, each of reconstructed images generated by the spatial light modulator 30 is quadrupled by the magnifying optical system 40 and is also shifted from position $P_0$ to position $P_2$ as shown in FIG. 2. The reconstructed images quadrupled by the magnifying optical system 40 are arranged in a series of tiles and are joined together at position $P_2$ of the second lens array 42 as shown in FIG. 2. This eliminates missing portions of the reconstructed image as a whole, which is otherwise formed due to gaps between the spatial light modulators 30.

In the electronic holography display apparatus 1, it is assumed that there is a relationship between the focal point distance $f_2$ of the third lens 51 and the focal point distance $f_3$ of the fourth lens 52 shown in Expression (3) as follows:

$$f_3 = \{h/(h+g)\} f_2 \qquad \text{Expression (3)}$$

The term "h/(h+g)" in Expression (3) as above means a reducing power of the reducing optical system 50. Given "g/h=k", the reducing power of the reducing optical system 50 can be represented by "1/k+1".

In the case as described above in which the ratio between the size h of the spatial light modulator 30 and the distance between two adjacent spatial light modulators 30 is 1:3, "$f_3=0.25 f_2$" is obtained from Expression (3) shown above. Hence, in the case illustrated in FIG. 2, the focal point distance $f_3$ of the fourth lens array 52 is made 0.25 times the focal point distance $f_2$ of the third lens array 51, and the reducing power of 1/(k+1) of the reducing optical system 50 is set at 0.25×.

With this configuration, each of reconstructed images having been magnified by the magnifying optical system 40 is reduced 0.25 times by the reducing optical system 50 and is also shifted from position $P_2$ to position $P_3$ as shown in FIG. 2. The reconstructed images reduced to a ¼ by the reducing optical system 50 are arranged in a series of tiles and are joined together at position $P_3$ of the fourth lens array 52 as shown in FIG. 2. Also, the reconstructed images as a whole are displayed at a size same as that in a case where the original spatial light modulators 30 arranged without any gaps therebetween. Note that a distance "b" between the second lens array 42 and the third lens 51 is not specifically limited and may take any value. Further, a distance "c" between the fourth lens 52 and the reconstructed image at position $P_3$ is not limited to a specific value, either, and varies depending on the focal point distance $f_2$ of the third lens 51, the focal point distance $f_3$ of the fourth lens 52, or the like.

As described above, in the electronic holography display apparatus 1, the ratio of the focal point distance $f_0$ of the first lens array 41 to the focal point distance $f_1$ of the second lens array 42 is made to be equal to the ratio of focal point distance $f_2$ of the third lens 51 to the focal point distance $f_3$ of the fourth lens 52, to thereby make the magnifying power of the magnifying optical system 40 to be equal to the reducing power of the reducing optical system 50. This makes it possible to join together a plurality of the spatial light modulators 30 and display the joined reconstructed image in an original size of the plurality of the spatial light modulators 30. The displayed 3D reconstructed image is therefore of the same size and viewing-zone angle as those of the original reconstructed image made up of the spatial light modulator 30 and has no missing portions.

In the electronic holography display apparatus 1 configured as described above, parallel beams emitted from the beam emitting device 10 are made incident on a plurality of the polarizing beam splitters 20 and are each separated according to polarization components thereof; and only beam of a prescribed polarization component (for example, S polarization) is reflected onto a plurality of the spatial light modulators 30. The beam reflected by the polarizing beam splitter 20 is made incident perpendicularly on the spatial light modulator 30 corresponding thereto and is modulated by the spatial light modulator 30 according to the hologram data. The beam modulated by the spatial light modulator 30 passes through the polarizing beam splitter 20 and is made incident on the magnifying optical system 40. Luminous flux thereof is then magnified by the magnifying optical system 40. This allows the reconstructed image by the spatial beam modulator 30 to be magnified and gaps between adjacent reconstructed images to be removed, which makes the adjacent reconstructed images joined together. The beam whose luminous flux has been magnified by the magnifying optical system 40 is made incident on the reducing optical system 50, by which the luminous flux is then reduced. This means that the viewing-zone angle of the reconstructed image which has been narrowed in exchange for magnifying the size thereof by the magnifying optical system 40 is magnified once again.

In the electronic holography display apparatus 1, the distance "a" between a plurality of the spatial light modulators 30 and the first lens array 41 is set based on a relation between: the ratio k of the distance between two spatial light modulator 30 to the size of the spatial light modulator 30; and the focal distance $f_0$ of the first lens array 41. This makes it possible to form the reconstructed image (actual image) magnified by the magnifying optical system 40 at a position of the second lens array 42, thus allowing the beam outgoing from the spatial light modulator 30 to be made incident on the second lens array 42 without fail.

Thus, in the electronic holography display apparatus 1 as described above, even if a plurality of the spatial light modulators 30 are disposed with prescribed distances therebetween, a 3D reconstructed image with no missing portions can be displayed without losing a parallax in a vertical direction, as in a case in which a plurality of the spatial light modulator 30 are disposed without gaps therebetween.

[Operations of Electronic Holography Display Apparatus]

Figure 3:
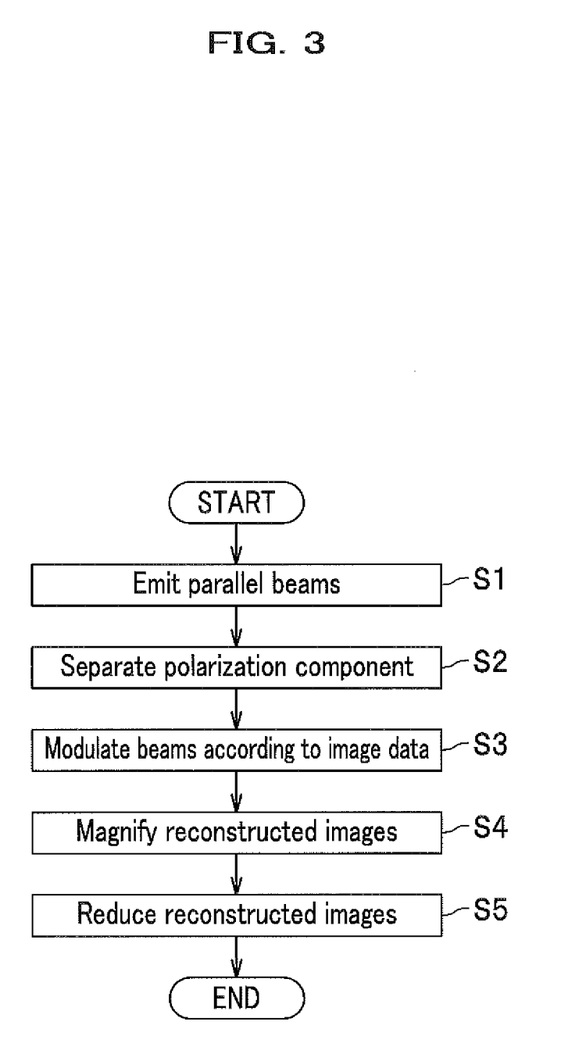
FIG. 3 is a flowchart illustrating operations of the electronic holography display apparatus according to the embodiment of the present invention.

Next are briefly described operations of the electronic holography display apparatus 1 with reference to FIG. 3. The beam emitting device 10 of the electronic holography display apparatus 1 emits parallel beams to the polarizing beam splitter 20 (step S1). The polarizing beam splitter 20 of the electronic holography display apparatus 1 separates a prescribed polarization component (herein, S polarization) and makes a beam of the separated polarization component vertically incident on to a plurality of the spatial light modulators 30 (step S2). The plurality of the spatial light modulator 30 of the electronic holography display apparatus 1 modulates the beam made incident from the polarizing beam splitter 20 to the magnifying optical system 40 according to hologram data inputted from the a hologram generation unit not shown (step S3). The magnifying optical system 40 of the electronic holography display apparatus 1 magnifies a luminous flux diameter of each of the beams emitted from a plurality of the spatial light modulator 30, to thereby magnifies the reconstructed image and emits the magnified reconstructed image to the reducing optical system 50 (step S4). The reducing optical system 50 of the electronic holography display apparatus 1 reduces a luminous flux diameter of each of the beams made incident from the magnifying optical system 40, to thereby reduce the reconstructed image (step S5). With those steps described above, the electronic holography display apparatus 1 can display a 3D reconstructed image without missing portions, even if a plurality of the spatial light modulators 30 are disposed with the prescribed distance "g" spaced apart from each other.

The electronic holography display apparatus of the present invention has been specifically explained above with the embodiment for carrying out the invention. Gist of the present invention is not limited to the description above and is to be broadly interpreted based on claims of the present invention. It will be obvious that those with various changes and modifications based on those descriptions are also included in the gist of the invention.

For example, though the electronic holography display apparatus 1 has been described taking an example in which, as illustrated in FIG. 1, nine units of the spatial light modulator 30 are used. The number of the spatial light modulators 30 is not, however, specifically limited and any number of the spatial light modulators 30 can be used. Also, the size h of the spatial light modulator 30 or the distance g between the adjacent spatial light modulators 30 is not specifically limited. The spatial light modulator 30 having any size h can be disposed with any distance g between the adjacent spatial light modulators 30.

The electronic holography display apparatus 1 may have, as shown in FIG. 2, light blocking units 44 which are located between the first lens array 41 and the second lens array 42 and partition light paths in each of which a pair of corresponding lenses 412, 421 are disposed. If the electronic holography display apparatus 1 has the above-described light blocking unit 44, for example, light from a non-displayed portion of the hologram, such as a fixing frame or wiring of a gap between the spatial light modulators 30, to thereby prevent the light from affecting the reconstructed image.

The electronic holography display apparatus 1 has been described with reference to FIG. 2, taking an example in which the ratio of the focal point distance $f_0$ of the first lens array 41 to the focal point distance $f_1$ of the second lens array 42 is made equal to the ratio of the focal point distance $f_2$ of the third lens 51 to the focal point distance $f_3$ of the fourth lens 52, to thereby make the reconstructed image display by the spatial light modulator 30 in an original size. However, another configuration is also possible in which the ratio of the focal point distance $f_0$ of the first lens array 41 to the focal point distance $f_1$ of the second lens array 42 is made different from the ratio of the focal point distance $f_2$ of the third lens 51 to the focal point distance $f_3$ of the fourth lens 52, to thereby make the reconstructed image displayed by the spatial light modulator 30 in a magnified or reduced size. In this case, for example, when the electronic holography display apparatus 1 determines the focal point distance $f_2$ of the third lens 51 and the focal point distance $f_3$ of the fourth lens 52 are determined, the electronic holography display apparatus 1 uses arbitrary focal point distance $f_2$, $f_3$, without using Expression (3) described above.

When, for example, the electronic holography display apparatus 1 magnification-displays a reconstructed image generated by the spatial light modulator 30, the electronic holography display apparatus 1 determines the focal point distance $f_2$ of the third lens 51 and the focal point distance $f_3$ of the fourth lens 52 such that the ratio of the focal point distance $f_3$ of the fourth lens 52 to the focal point distance $f_2$ of the third lens 51 is smaller than the focal point distance $f_1$ of the second lens array 42 to the focal point distance $f_0$ of the first lens array 41. This allows the electronic holography display apparatus 1 to display a reconstructed image which has a magnified image size compared to the original reconstructed image generated by the spatial light modulators 30. Note that, in this case, the reconstructed image finally displayed has a narrower viewing-zone angle than that of an original reconstructed image generated by the spatial light modulator 30, because the reducing power of the reducing optical system 50 is smaller than the magnifying power of the magnifying optical system 40.

On the other hand, when, for example, the electronic holography display apparatus 1 reduction-displays the reconstructed image generated by the spatial light modulators 30, determines the focal point distance $f_2$ of the third lens 51 and the focal point distance $f_3$ of the fourth lens 52 such that the ratio of the focal point distance $f_3$ of the fourth lens 52 to the focal point distance $f_2$ of the third lens 51 is larger than the focal point distance $f_1$ of the second lens array 42 to the focal point distance $f_0$ of the first lens array 41. This allows the electronic holography display apparatus 1 to display a reconstructed image which has a reduced image size compared to the original reconstructed image generated by the spatial light modulators 30. Note that, in this case, the reconstructed image finally displayed has a wider viewing-zone angle than that of the original reconstructed image generated by the spatial light modulator 30, because the reducing power of the reducing optical system 50 is larger than the magnifying power of the magnifying optical system 40.

As described above, the electronic holography display apparatus 1 can join and display a reconstructed image generated by a plurality of the spatial light modulators 30, in a state where a size of the reconstructed image is magnified or reduced, by making a value of the magnifying power of the magnifying optical system 40 different from a value of the reducing power of the reducing optical system 50. This makes it possible to display a 3D reconstructed image without missing portions and with an image size or a viewing-zone angle different from that of the original reconstructed image generated by the spatial light modulators 30.

DESCRIPTION OF REFERENCE NUMERALS

1 electronic holography display apparatus
10 beam emitting device
20 polarizing beam splitter
30, 130 spatial light modulator
40 magnifying optical system
41 first lens array
411 lens
42 second lens array
421 lens
43 first spatial filter
431 opening
44 light blocking unit
50 reducing optical system
51 third lens
52 fourth lens
53 second spatial filter
531 opening

The invention claimed is:

1. An electronic holography display apparatus which displays a 3D reconstructed image based on an electronically generated hologram, comprising:
   a beam emitting device that emits parallel beams;
   a plurality of polarizing beam splitters each of which reflects, from the parallel beams emitted from the beam emitting device, a portion of polarization components contained in the parallel beams, makes another portion of the polarization components pass therethrough, and makes a beam coming from a direction of the reflection pass therethrough;
   a plurality of spatial light modulators each of which is disposed in a same plane with a prescribed distance between adjacent spatial light modulators, facing each of the corresponding polarizing beam splitters, modulates a beam which has been reflected by the polarizing beam splitter and has been then made incident vertically thereon, and emits the modulated beam;
   a magnifying optical system that magnifies a luminous flux diameter of each of the beams having been emitted from a plurality of the spatial light modulators and then having been passed through a plurality of the corresponding polarizing beam splitters; and
   a reducing optical system that reduces the luminous flux diameter of the beam emitted from the magnifying optical system,
   wherein the magnifying optical system comprises:
      a first lens array that is disposed on an emission side of the spatial light modulators and includes a plurality of lenses disposed in array in a same plane, corresponding to each of the spatial light modulators; and
      a second lens array that is disposed on an emission side of the first lens array, includes a plurality of lenses disposed in array in a same plane, corresponding to each of the lenses constituting the first lens array, and has a focal point distance larger than that of the first lens array,
   wherein the reducing optical system comprises:
      a third lens that is disposed on an emission side of the second lens array and has a diameter such that the beam emitted from the second lens array can be made incident thereon; and
      a fourth lens that is disposed on an emission side of the third lens and has a focal point distance smaller than that of the third lens, and
   wherein a distance "a" between the spatial light modulator and the first lens array is represented by $a=(k+2)f_0/(k+1)$, in which "k" is a ratio of a distance between two adjacent spatial light modulators, to a size of the spatial light modulator, and $f_0$ is the focal point distance of the first lens.

2. The electronic holography display apparatus according to claim 1,
   wherein a ratio of focal point distance of the second lens array to the focal point distance of the first lens array is equal to a rate of the focal point distance of the fourth lens to the focal point distance of the third lens.

3. The electronic holography display apparatus according to claim 1,
   wherein a ratio of focal point distance of the second lens array to the focal point distance of the first lens array is different from a rate of the focal point distance of the fourth lens to the focal point distance of the third lens.

* * * * *